United States Patent
Haridas et al.

(10) Patent No.: US 11,385,691 B2
(45) Date of Patent: Jul. 12, 2022

(54) METHOD FOR NODE MESSAGE SYNCHRONIZATION

(71) Applicant: Honeywell International Inc., Morris Plains, NJ (US)

(72) Inventors: Harshal Haridas, Jamison, PA (US); Lukas Pohanka, Prague (CZ); Michal Hojsik, Prague (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 241 days.

(21) Appl. No.: 16/777,702

(22) Filed: Jan. 30, 2020

(65) Prior Publication Data
US 2021/0243166 A1 Aug. 5, 2021

(51) Int. Cl.
*G06F 1/24* (2006.01)
*H04L 9/40* (2022.01)
*H04L 12/18* (2006.01)

(52) U.S. Cl.
CPC ............ *G06F 1/24* (2013.01); *H04L 12/1881* (2013.01); *H04L 63/0435* (2013.01)

(58) Field of Classification Search
CPC ..... H04L 63/04; H04L 12/18; H04L 63/0435; G06F 1/24
See application file for complete search history.

(56) References Cited

U.S. PATENT DOCUMENTS

| | | | |
|---|---|---|---|
| 5,345,589 A * | 9/1994 | King | H04L 43/00 709/248 |
| 10,348,704 B2 | 7/2019 | Figueira | |
| 2004/0177213 A1* | 9/2004 | Engel | H04L 63/164 711/103 |
| 2009/0170539 A1* | 7/2009 | Kortge | H04L 63/1441 455/466 |
| 2017/0093731 A1* | 3/2017 | Flajslik | H04L 43/10 |
| 2018/0183591 A1* | 6/2018 | De Laat | H04L 63/061 |
| 2019/0280879 A1* | 9/2019 | Lin | G06F 16/1824 |

\* cited by examiner

*Primary Examiner* — Chun Cao
(74) *Attorney, Agent, or Firm* — Seager, Tufte & Wickhem, LLP

(57) ABSTRACT

Systems for communicating over a network and between two or more network connected devices. In particular, the disclosure reveals systems which include a first node having a first node message sequence counter, a second node having a second node message sequence counter, and wherein the second node is configured to synchronize the first node message sequence counter based on the second node message sequence counter.

19 Claims, 5 Drawing Sheets

METHOD FOR NODE MESSAGE SYNCHRONIZATION

BACKGROUND

The present disclosure pertains to communicating between network connected devices and particularly mechanisms that synchronize anti-replay and duplicate message sequence counters in authenticated (and possibly also encrypted) multicast network protocols consisting of multiple nodes.

SUMMARY

The disclosure reveals systems for communicating over a network and between two or more network connected devices. In particular, the disclosure reveals systems which may synchronize anti-replay and duplicate message sequence counters in authenticated (and possibly also encrypted) multicast network protocols consisting of multiple nodes. In some instances, multicast traffic may be secured using a common group session key. Further, the node message sequence numbers (NMSN) may be scoped within a valid session to detect duplicate and replayed messages. Including these anti-replay and duplicate node message sequence counters in protocols is standard and assists nodes to discard unintended messages during communications. Another design element which may be seen in standard protocols is resetting sequence numbers when session key changes are required. Standard architectures like GDOI may provide mechanisms to distribute group session key to participating group members. However, due to attributes of session key (e.g., being common and used by multiple nodes), the policies around key lifetime and re-keying are very strict to ensure proper use of the key. This may force frequent re-keying of the common key in simple scenarios like node reboots. Further, frequent re-keying may also result in a dependency on an external key distribution center component, extra processing of session key transition at nodes not rebooting, and communication disruption in the network with increase in group size or during power loss which results in multiple node reboots. Additionally, it may be undesirable to have a single fault, failure or unavailability of a key distribution center component during node boot up scenarios. Similarly, it may be undesirable to have additional processing at non-booting up nodes, which may result in standard solutions unlikely to be used for applications in real time distributed control systems. Therefore, allowing a booting up node to synchronize its session keys and node message sequence numbers with the rest of the participating network nodes before it can send and receive secure multicast messages may mitigate the issues resulting from utilization of standard solutions, as described above Accordingly, this disclosure introduces a methodology which may synchronize anti-replay and duplicate message sequence counters in authenticated (and possibly also encrypted) multicast network protocols consisting of multiple nodes. Further, this disclosure describes methods which may remove the need to rekey during boot ups and may introduce a unique manner to synchronize node sequence numbers across the secure group. In some cases, the mechanisms may allow node boot ups when key distribution components are temporarily unavailable, may discard scenarios and network churn for simultaneous multi-session key refreshes caused due to multi-node boot ups, and may remove the possibility for a booting up node to accept an older replayed message from a removed node from the network, thereby limiting the time window during which a reply attack may target a booting-up node.

DESCRIPTION

Figure 1:
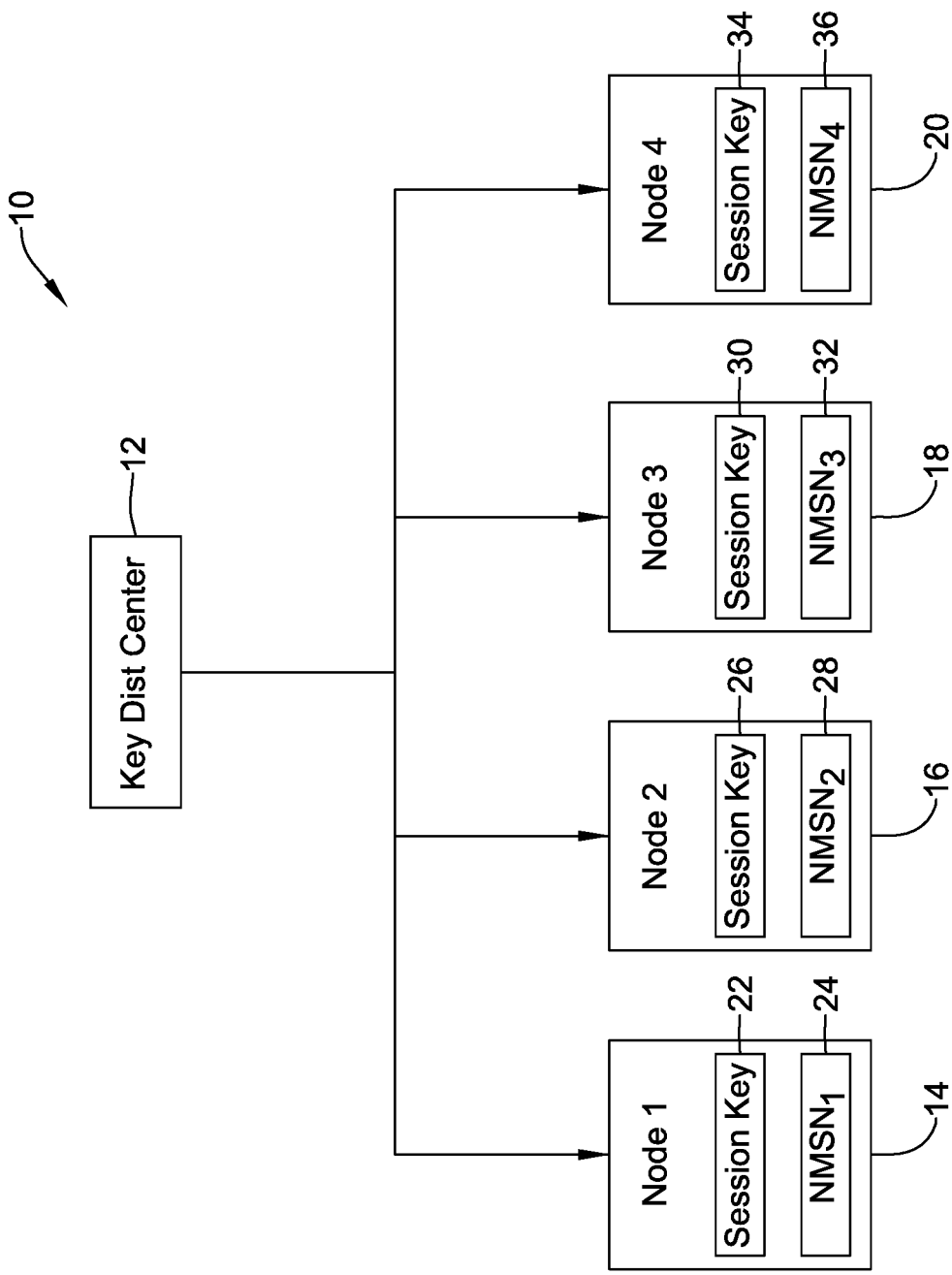
FIG. 1 is a schematic diagram of an illustrative example of network connected devices.

The present system and approach may incorporate one or more sensors, computers, controllers, workstations, servers, user interfaces, and/or the like (e.g., "nodes"), in an implementation described and/or shown herein.

This description may provide one or more illustrative and specific examples or ways of implementing the present system and approach. There may be numerous other examples or ways of implementing the system and approach.

A framework of a standardized system may specify a set of requirements for nodes to communicate over a network (e.g., a multicast communication based network). These requirements may require nodes to respond to multicast and/or unicast traffic originating from a node to allow the node to discover other nodes and the other nodes' services, along with allowing the node to pair with and access the services of the other nodes. However, in some instances, local computer network (LCN) multicast communication may be exposed to a variety of different IP/Ethernet based security exploits. For example, multicast communication on a commercial-off-the-shelf (COTS) based Ethernet network may be vulnerable to increased security risks, making a COTS-based Ethernet network attractive to hackers attempting to gain access to the network. Therefore, securing multicast traffic may provide message integrity and confidentiality, helping to mitigate the increased security risks.

Further, multicast or broadcast networks typically incorporate symmetric key cryptography to improve communication performance. As result, a special node, called a key distribution center (KDC), may be included and take care of distribution of a common (usually symmetric) shared secret key (SK). All participating nodes use this shared secret key to sign (and possibly also encrypt) the multicast communication. In another case, public key cryptography could also be used, such that nodes use their own private key to sign messages and verify messages using public keys of other nodes, which means no KDC is needed, only a shared list of all node public keys. In any case, to avoid a message replay, a unique value must be included in each authenticated message. The uniqueness of such value must be universally verifiable by any node in the network at the given time. In networks, where universal time is reliably synchronized, the current time can be easily used as such unique value. However, there are many cases where nodes do not have any means of reliable and authenticated universal time synchronization or even no time-awareness at all.

In such cases, networks will typically employ some sort of anti-replay node message counter. In a typical case, each node may maintain its own. Node Message Sequence Number (NMSN), a value which increases with each message sent by this node. Before signing an outgoing message, the current NMSN value is attached to the message.

To prevent message replay, each node in network may keep a table of NMSN's of all other nodes in network. Upon receiving an authenticated multicast message from another node in network, a node may verify the message signature and then check if the NMSN in the received message is greater than the NMSN counter value in its own NMSN table. If so, the node may update its own table with the new value and accept the message. If it is less or equal, the node may discard the message, as in an ideal reliable network a repeated counter value implies a replayed message.

However, multicast networks may not be reliable and packet re-ordering may occur. If a node transmits messages in a sequence with strictly increasing NMSN counter values, the sequence at which they arrive to the recipient might be re-ordered, so that the counter values are no longer monotonically increasing. A commonly used technique to prevent this is to allow the NMSN counter on the message to be greater or equal to the value in the NMSN table minus some fixed constant. The node may keep track of these NMSN counter values received out-of-order and will ignore the message if any of those are seen more than once.

Once all nodes are online and communicating, each node may keep track of the NMSN of all other nodes by simply listening to the network. In the symmetric scenario, whenever SK changes, each node may reset its own NMSN counter and the NMSN of all other nodes in its table to zero. The KDC should distribute the new session keys regularly to make sure the NMSN counters do not overflow. The NMSN table is created dynamically, as the messages of nodes not seen before may arrive with its NMSN value. In the asymmetric key scenario, different methods of counter overflow prevention may be implemented.

However, a problem may arise if one or more nodes unexpectedly stop listening (e.g., unexpected shutdown or network failure). During the period a node is down, it may lose track of the NMSN counters of other nodes. If the session key does not change during the node down-time, it can successfully re-establish communication after recovering. However, before the recovering node sees messages from all other nodes on the network and updates their respective NMSN values in its table, it is susceptible to a replay attack.

For example, during a node down-time, an attacker may passively listen and record the multicast communication described above. If the attacker manages to replay an old message (signed with the same session key or node private key and recorded during the node down-time) from some other node A to the recovering node B before B sees a legitimate message from A, the recovering node B will successfully verify the message signature using the session key (or node A public key) and accept the message. This is because the NMSN counter in the replayed message is likely greater than the current value the recovering node B has in its NMSN table (an old stored value or even zero). Therefore, node B will think the replayed message is a fresh legitimate message from A.

The period of susceptibility to the replay attacks varies on the network traffic. The recovering node may retrieve the NMSN values from the nodes that communicate often almost instantly, leaving the window of opportunity to a minimum. However, for a node that seldom communicates, it can take a significant amount of time until a legitimate message is sent and the recovering node can learn its actual NMSN value. In such cases, an attacker may have a large window of opportunity to replay a message from such node if the session key did not change.

One solution to tackle such problem is to change the session key often, so that there is always a strictly limited amount of time a message could be replayed. This may not be possible in the asymmetric key scenario unless the node generates a new keypair and distributes it to other nodes. For the symmetric variant, changing shared session keys often might be a solution however, it imposes a dependency on the availability of a KDC which distributes the new session key to the entire network. It may be the case that the KDC also fails during a node down-time (a double failure), or that the KDC is simply put offline on purpose for longer periods of time or it simply cannot be required to be online all the time.

The methodology described herein may solve a node message sequence counter synchronization problem by introducing a counter consensus protocol which may consist of two multicast messages authenticated using current shared symmetric key or node private key systems. It is noted that for the sake of simplicity, the following description will be described for the shared symmetric key system. However, this is not intended to be limiting. Rather, it can be appreciated that the methodology disclosed herein may be utilized when node asymmetric keys are being used for message authentication. In that instance, the shared symmetric key may be replaced by sending a node's private key for signing and receiving a node's public key for verification. Further, the following description assumes that the recovering node has the latest shared symmetric key.

Turning to the figures, FIG. 1 depicts a secure multicast network 10. The network 10 may incorporate one or more networks and may incorporate one or more types of networks. Illustratively, the network 10 may incorporate a local area network (LAN), a wide area network (WAN), and/or one or more other networks connecting two or more computing devices. Although numerous networks may be disclosed as connecting two or more computing devices, these networks 10 may be a single network or several networks.

The secure multicast network 10 may be utilized to secure a multicast communication at various network levels such as Ethernet multicast and/or IP multicast. As illustrated in FIG. 1, the system may include one or more devices which are in communication with a plurality of nodes. For examples, as illustrated in FIG. 1, the network 10 may include a key distribution center 12 (e.g., a distribution server) which may be in communication with one or more nodes Node 1 14, Node 2 16, Node 3 18, Node 4 20, and so on). In a general sense, the nodes (e.g., Node 1 14, Node 2 16, Node 3 18, Node 4 20) may be entities that participate in the secure multicast communication network at any point in time. As discussed above, the nodes (e.g., Node 1 14, Node 2 16, Node 3 18, Node 4 20) may include sensors, computers, controllers, workstations, servers, user interfaces, and/or the like. Further, the secure multicast network 10 may include a group of nodes that communicate using a secure multicast communication protocol.

Additionally, the key distribution center 12 may be responsible for adding and/or removing nodes from the secure multicast network 10. In some examples, the key distribution center 12 may regularly distribute session keys to authorized nodes (e.g., nodes which meet the security requirements to join the secure multicast network 10).

FIG. 1 further illustrates that the Node 1 14, Node 2 16, Node 3 18 and Node 4 20 may each be in possession of a common shared secret session key. For example, FIG. 1 illustrates that Node 1 14 may possess a first node session key 22, the Node 2 16 may possess a second node session key 26, the Node 3 18 may possess a third node session key 30, and the Node 4 20 may possess a fourth node session key 34. As discussed above, the first node session key 22, the second node session key 26, the third node session key 30 and the fourth node session key 34 may be a common session key shared by each of Node 1 14, Node 2 16, Node 3 18 and Node 4 20.

Additionally, FIG. 1 illustrates that each of Node 1 14, Node 2 16, Node 3 18 and Node 4 20 may each possess a node message sequence number (NMSN) table. For example, Node 1 14 may possess a first node message sequence number table 24, Node 2 16 may, possess a second node message sequence number table 28, Node 3 18 may possess a third node message sequence number table 32, and Node 4 may possess a fourth node message sequence number table 36. Each node message sequence number table may include the NMSN's for all other nodes on the network.

Figure 2:
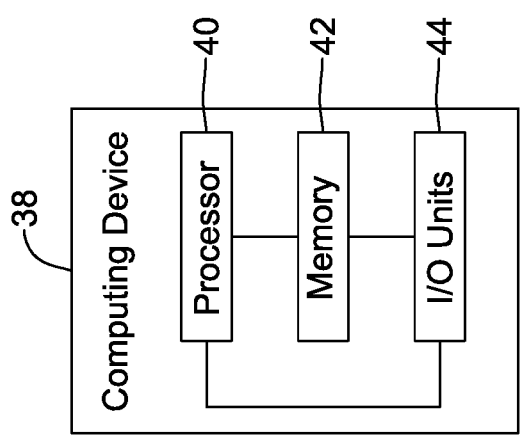
FIG. 2 is a schematic diagram of a computing device.

FIG. 2 illustrates that some example systems and approaches described herein may include a computing device 38. In one example, a network utilizing multicast communication protocols described herein may include one or more computing devices. The computing device 38 may include, among other suitable components, a processor 40, memory 42, and an I/O unit 44.

The processor 40 of the computing device 38 may include a single processor or more than one processor working individually or with one another. The processor 40 may be configured to execute instructions, including instructions that may be loaded into the memory 42 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 42 of the computing device 38 may include a single memory component or more than one memory component each working individually or with one another. Example types of memory may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 42 may be or may include a non-transitory computer readable medium.

The I/O units 44 of the computing device 38 may include a single I/O component or more than one I/O component each working individually or with one another. Example I/O units 44 may be any type of communication port configured to communicate with other components of the building management system. Example types of I/O units 44 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

Figure 3:
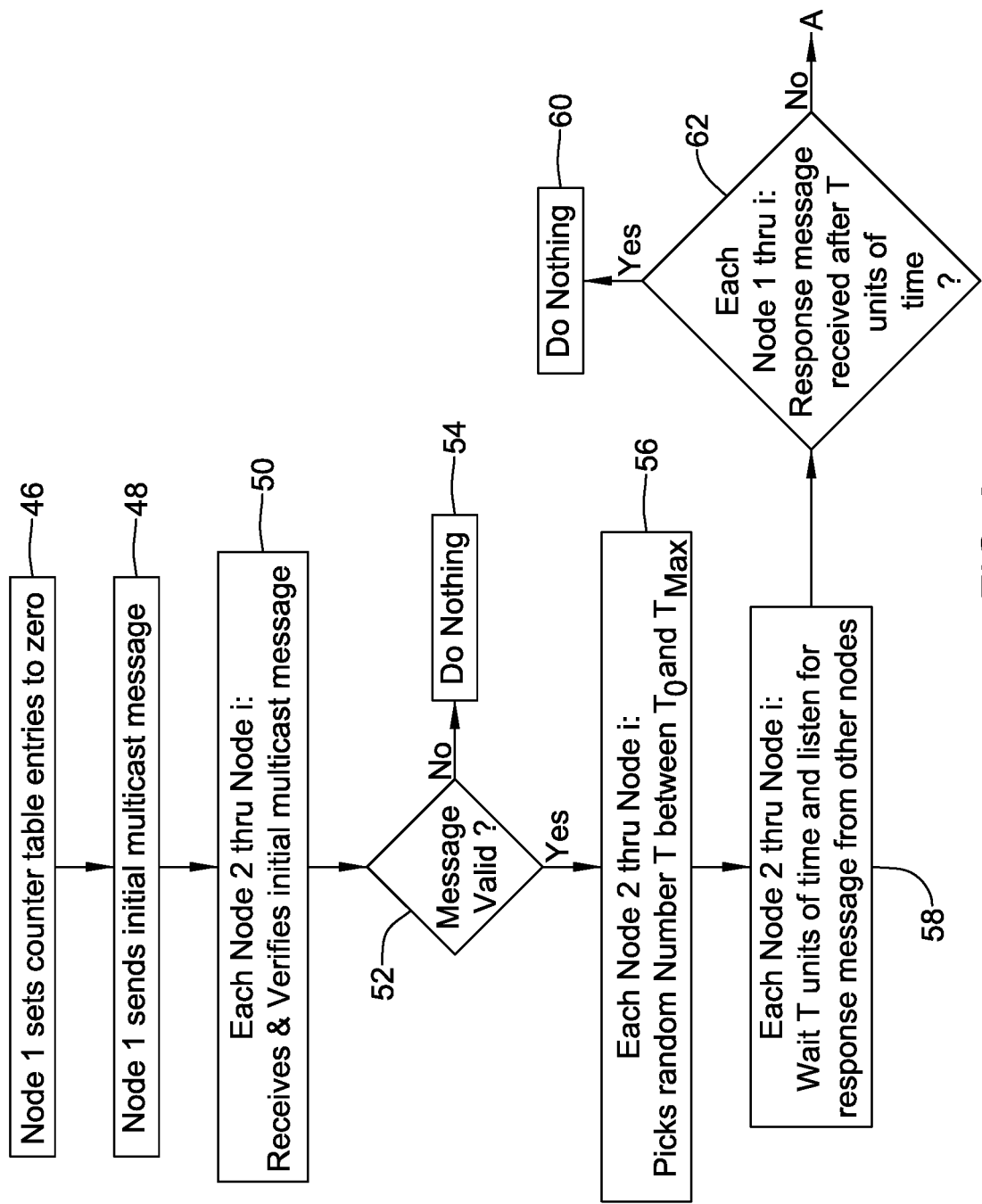
FIG. 3 and FIG. 4 are schematic flow diagrams of a synchronization methodology.
Figure 4:
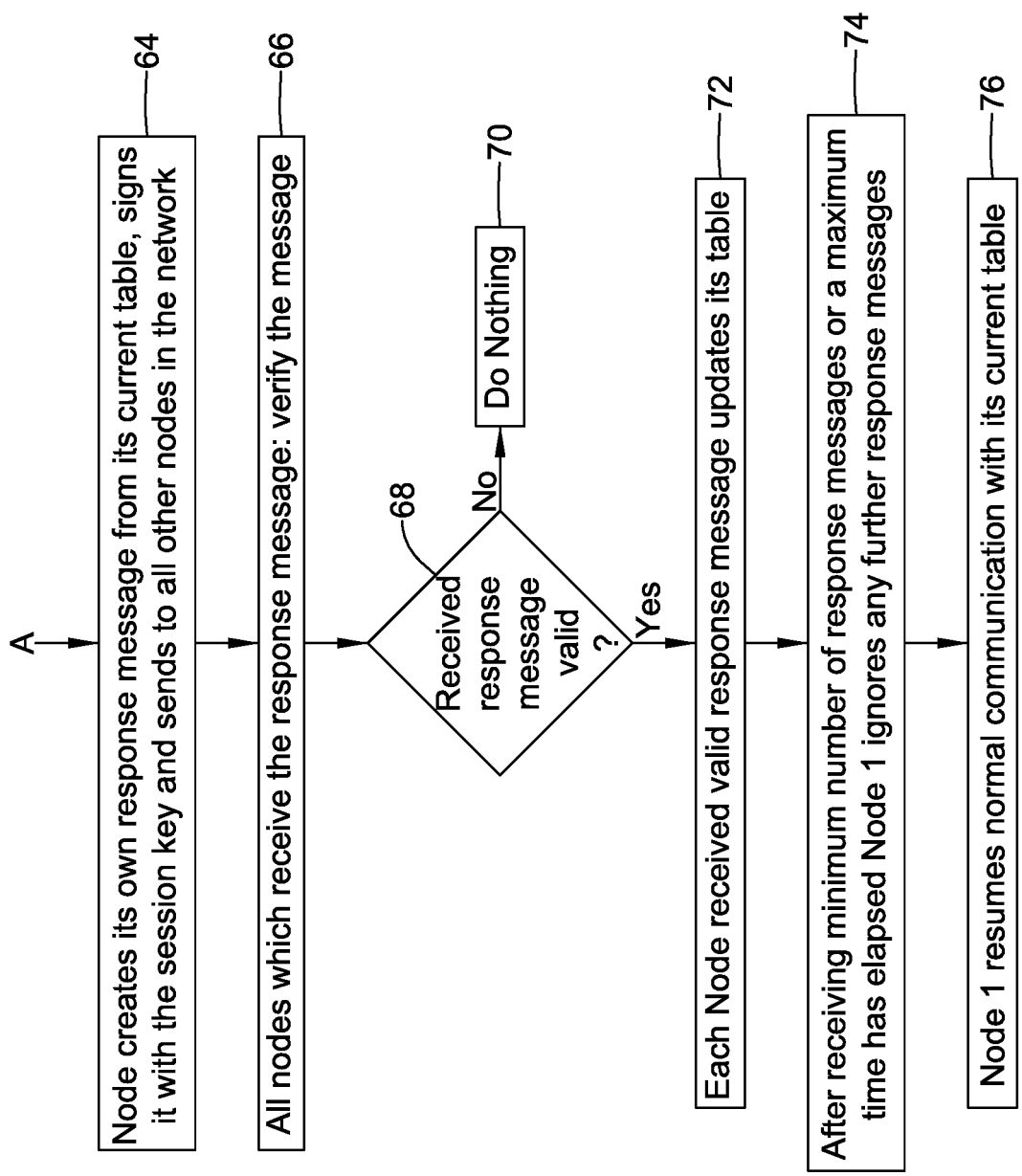

FIG. 3 and FIG. 4, together, describe a node message sequence counter synchronization methodology which allows a booting up node to synchronize its session keys and node message sequence numbers with the remainder of the network's participating nodes before it can send and receive secure multicast message. For purposes of FIG. 3 and FIG. 4, the following disclosure assumes a network of multiple nodes (such Node 1 14, Node 2 16, Node 3 18 and Node 4 20 of the network 10 shown in FIG. 1), all of which are assumed to be in possession of a common shared session key (such as that described above). Additionally, it is assumed for purposes of the following disclosure that Node 1 14 is a recovering after a period of being down. Additionally, it is also assumed that Node 1 14 has a means to determine that its last known session key is still currently being used by the rest of the network (e.g., the recovering node sees the network communication uses the same session key identification). It is noted that, for the following methodology, if the recovering node realizes it does not have the same session key as the rest of the network, it will not attempt to initiate any of the steps described herein.

Turning to FIG. 3 and FIG. 4, an example first step in the methodology may include recovering Node 1 14 setting 46 all the values in its NMSN counter table to zero. Node 1 14 may then send 48 an initial multicast message to all other nodes on the network. The initial multicast message sent by Node 1 (the recovering node) may ask the other network nodes to share their NMSN counter tables, each of which is signed by the last known session key possessed by that respective node. The next step may include each node in communication with the recovering node (e.g., Node 2 16, Node 3 18 and Node 4 20 of the network 10 shown in FIG. 1) to receive and verify 50 the initial multicast message by comparing the node's known session key with the session key attached to the initial multi cast message. Further, if a node receives the initial multicast message sent by Node 1 14, it may check 52 if the initial multicast message sent by Node 1 14 is valid. If the message is not valid, the node will do nothing 54. However, if the initial multicast message received by any node is valid, the node which received and validated the message will randomly pick 56 a time value (I) between zero ($T_0$) and a maximum time value ($T_{Max}$). After randomly selecting a time value, the node may listen 58 for other nodes to respond over the duration of the node's respective randomly-generated time value. If a node which has received and verified the initial multicast message receives a response message after its respective time value has expired 62, the node will do nothing 60. However, if any node in the network which has received and verified the initial multicast message sent from Node 1 14 has not received a response after its respective time value, the node will create 64 its own response message, sign it with the its current session key (which is assumed to match the session key attached to the initial multicast message) and send it to all the other nodes in the network. In some examples, the response message sent by an online node as a response an initial multicast message may contain the NMSN of all nodes on the network (to that the node's current best knowledge). Next, any node in the network which receives the response message will verify 66 the response message by checking 68 if the response message is valid. If the response message received by a node is not valid, the node will do nothing 70. If the response message received by a node is valid, the node will update its respective NMSN counter table 72 by comparing each value in its own respective NMSN table (including the values for all the network nodes visible to the updating node) with the corresponding value in the NMSN table received in the response message. For every entry in the node's own counter table which is less than the corresponding entry in the received NMSN table, the node will replace its own table entry with that of the corresponding value from the received counter table. Further, any node which has received a minimum number of response messages (set as a global constant across the network) and/or realizes a maximum time (set as a global constant across the network) has elapsed, will ignore 74 any further response messages and will resume 76 normal communications with its updated NSMN counter table.

Figure 5:
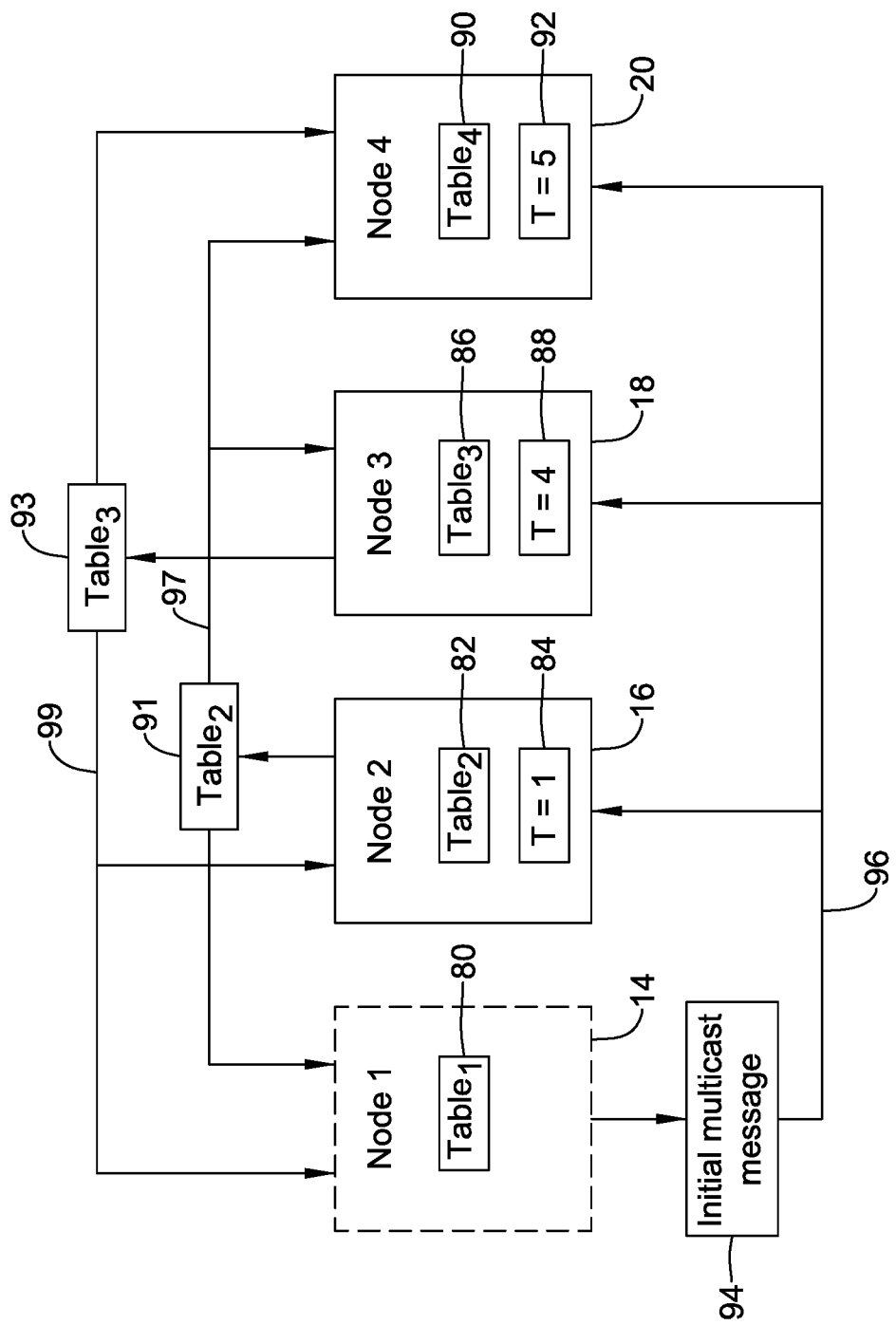
FIG. 5 is a schematic diagram of a further illustrative example of communication between components over a network.

FIG. 5 illustrates the example network 10 (shown in FIG. 1) establishing a consensus of NMSN values for the nodes present on the network after Node 1 14 reboots (after being offline). Node 1 14 is represented as a rebooting node via a dashed line in FIG. 5. Further, prior to synchronization, Node 1 14 possesses its current NMSN table 80. Node 2 16, node 3 18, and node 4 20 may possess NMSN tables 82, 86 and 90, respectively.

Once it realizes it is rebooting, Node 1 14 may reset all the values in its NMSN counter table 80 to zero. As discussed above, to synchronize its NMSN table 80, Node 1 may send an initial multicast message 94 to all the nodes on the network (e.g., Node 2 16, Node 3 18 and Node 4 20). FIG. 5 depicts the initial multicast message being sent to the other nodes via the line 96. Each node on the network which receives and validates the initial multicast message 94 sent by Node 1 14 will randomly generate a time value. For purposes of this example, it is assumed that Node 2 16, Node 3 18 and Node 4 20 each receive and validate the initial multicast message 94 via matching their respective session key with the session key attached to the initial multicast message 94.

Further, as an example, FIG. 5 illustrates that, after receiving the initial multicast message, Node 2 16 has randomly generated a time value 84 of "1" time unit, Node 3 18 has randomly generated a time value 88 of "4" time units, and Node 4 16 has randomly generated a time value 92 of "5" time units. FIG. 5 further illustrates that after randomly-generating their respective time values, Node 2 16, Node 3 18 and Node 4 20 will wait and listen for a response message from other nodes on the network. However, each of Node 2 16, Node 3 18 and Node 4 20 will only listen for the duration of their respective time value, after which any node having not received a response message will send a response message to the other nodes on the network. For example, after "1" time units have passed. Node 2 16 will send a response message to Node 1 14, Node 3 18 and Node 4 20. The response message sent by Node 2 will include the current NMSN counter table 91 of Node 2 16. In FIG. 5, line 97 represents Node 2 releasing the response message to Node 1 14, Node 3 18 and Node 4 20. Similarly, after "4" time units have passed, Node 3 18 will send a response message to Node 1 14, Node 2 16 and Node 4 20. The response message sent by Node 3 may include the current NSMN counter table 93 of Node 2 16 and Node 3 18. In FIG. 5, line 99 represents Node 3 18 releasing the response message to Node 1 14, Node 2 16 and Node 4 20.

Additionally, as discussed above, in some examples, the network may include a global maximum time value which halts the sending of response messages by any node. As an example, in the scenario illustrated in FIG. 5, if the global maximum time value were set to 4.5 time units, Node 4 would be prevented from sending a response message because its randomly generated time value 92 is "5" time units (which exceeds the global maximum time value of 4.5).

Further, as discussed above, in some examples, the network may also include a global maximum number of "received response messages" which, like the global maximum time value constraint discusses above, may halt the sending of response messages by any node once a given node receives the preset maximum number of response messages. As an example, in the scenario illustrated in FIG. 5, if the global maximum number of received response message were set to two, Node 4 would be prevented from sending a response message after having received a total of two response messages from Node 2 16 and Node 3 18.

It can further be appreciated that, in the scenario depicted in FIG. 5, after Node 3 18 has sent its response message (which includes the NMSN counter table of Node 3 18) to Node 1 14, Node 2 16 and Node 4 20, all of the NMSN counter tables for each node on the network would be synchronized to the counter table 93 of Node 3 18.

It can be appreciated that the above methodology may establish a consensus of NMSN of values of all nodes present on a network by taking the maximum value of each NMSN as sent by a random sample of nodes on the network. This may solve a problem of NMSN of near-idle or rarely communicating nodes because the response message contains the NMSN of all nodes, as currently seen by the replying node. Because the up-times of the random replying nodes may vary randomly, the NMSN of near-idle nodes may appear at least in some of the response messages.

A variation of the above method may include omitting the global maximum number of response messages received and including only a global maximum time value condition. In that scenario, a recovering node may simply start communication in a certain period after sending the initial multicast message, regardless of the number of response messages received.

Another variation may include storing the NMSN table to a non-volatile storage and re-loading it during recovery in a manner similar to session key. In that scenario, the first step in the method may initialize the NMSN table to the stored values rather than zeros.

A recap may be provided in the following. A system for secured messaging may include a network system including a first node having a first node message sequence counter and a second node having a second node message sequence counter, wherein the first node is configured to synchronize the first node message sequence counter based on the second node message sequence counter.

The first node of the system for secured messaging may be configured to identify that it is a rebooting node and will reset the values of the first node message sequence counter to zero in response to identifying that it is rebooting.

The first node of the system for secured messaging may be configured to send an initial multicast message to the second node after resetting the values of the first node message sequence counter to zero.

The second node of the system for secured messaging may randomly generate a first time value unit after receiving the initial multicast message from the first node.

The second node of the system for secured messaging may generate a response message after expiration of the first time value unit, and the response message may include the second node message sequence counter.

The second node of the system for secured messaging may send the response message to the first node.

The first node of the system for secured messaging may update the values of the first node message sequence counter with the values of the second node message sequence counter.

Another system for secured messaging may include a network system including a first node having a first node message sequence counter, a second node having a second node message sequence counter and a server in communication with the first node and the second node, wherein the first node is configured to synchronize the first node message sequence counter with the second node message sequence counter without the first node, the second node or both the first node and second node receiving an updated session key from the server.

The first node of the system for secured messaging may be configured to identify that it is a rebooting node and will reset the values of the first node message sequence counter to zero in response to identifying that it is rebooting.

The first node of the system for secured messaging may be configured to send an initial multicast message to the second node after resetting the values of the first node message sequence counter to zero.

The second node of the system for secured messaging may randomly generate a first time value unit after receiving the initial multicast message from the first node.

The second node of the system for secured messaging may generate a first response message after expiration of the first time value unit, and the first response message may include the second node message sequence counter.

The system for secured messaging may further include a third node having a third node message sequence counter, wherein the first node may send the initial multicast message to the third node, and wherein the second node may send the first response message to the first node and the third node.

The third node of the system for secured messaging may randomly generate a second time value unit after receiving the initial multicast message from the first node.

The third node of the system for secured messaging may update the values of the third node message sequence counter with the values of the second node message sequence counter.

The third node of the system for secured messaging may generate a second response message after expiration of the second time value unit, and the second response message may include the values of the second node message sequence counter and the values of the third node message sequence counter.

The third node of the system for secured messaging may send the second response message to the first node.

The first node of the system for secured messaging may update the values of the first node message sequence counter with the values of the third node message sequence counter.

An example method for secured messaging may include synchronizing a node message sequence counter of a rebooting node of a plurality of nodes, wherein a first node of plurality of nodes may output a multicast message to a plurality of nodes, a second node of the plurality of nodes may send its node message sequence counter to the first node and in response to receiving the multicast message, the system may synchronize the node message sequence counter of the first node with the node message sequence counter of the second node.

The method for secured messaging may include that the first node of the secured message system is the rebooting node and may send out the multicast message in response to rebooting.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to incorporate all such variations and modifications,

What is claimed is:

1. A network system for secured messaging, comprising:
a first node having a first node message sequence counter; and
a second node having a second node message sequence counter; and
wherein the first node is configured to synchronize the first node message sequence counter in response to a response message received from the second node;
wherein the response message received from the second node includes the second node message sequence counter;
wherein the first node ignores any further response messages after receiving the response message from the second node;
wherein the first node resumes normal communication with other nodes using the synchronized first node message sequence counter.

2. The system of claim 1, wherein the first node is configured to identify that it is a rebooting node and will reset the values of the first node message sequence counter to zero in response to identifying that it is rebooting.

3. The system of claim 2, the first node is configured to send an initial multicast message to the second node after resetting the values of the first node message sequence counter to zero.

4. The system of claim 3, wherein the second node randomly generates a first time value unit after receiving the initial multicast message from the first node.

5. The system of claim 4, wherein the second node generates the response message after expiration of the first time value unit, and wherein the response message includes the second node message sequence counter.

6. The system of claim 5, wherein the first node updates the values of the first node message sequence counter with the values of the second node message sequence counter.

7. A network system for secured messaging, comprising:
a first node having a first node message sequence counter;
a second node having a second node message sequence counter; and
a server in communication with the first node and the second node; and
wherein the first node is configured to synchronize the first node message sequence counter with the second node message sequence counter without the first node, the second node or both the first node and second node receiving an updated session key from the server;
wherein the first node is configured to synchronize the first node message sequence counter in response to a first response message received from the second node;
wherein the first response message received from the second node includes the second node message sequence counter;
wherein the first node ignores any further response messages after receiving the response message from the second node;
wherein the first node resumes normal communication with other nodes using the synchronized first node message sequence counter.

8. The system of claim 7, wherein the first node is configured to identify that it is a rebooting node and will reset the values of the first node message sequence counter to zero in response to identifying that it is rebooting.

9. The system of claim 8, the first node is configured to send an initial multicast message to the second node after resetting the values of the first node message sequence counter to zero.

10. The system of claim 9, wherein the second node randomly generates a first time value unit after receiving the initial multicast message from the first node.

11. The system of claim 10, wherein the second node generates the first response message after expiration of the first time value unit, and wherein the first response message includes the second node message sequence counter.

12. The system of claim 11, further comprising a third node having a third node message sequence counter, wherein the first node sends the initial multicast message to the third node, and wherein the second node sends the first response message to the first node and the third node.

13. The system of claim 12, wherein the third node randomly generates a second time value unit after receiving the initial multicast message from the first node.

14. The system of claim 13, wherein the third node updates the values of the third node message sequence counter with the values of the second node message sequence counter.

15. The system of claim 14, wherein the third node generates a second response message after expiration of the second time value unit, and wherein the second response message includes the values of the second node message sequence counter and the values of the third node message sequence counter.

16. The system of claim 15, wherein the third node sends the second response message to the first node.

17. The system of claim 16, wherein the first node updates the values of the first node message sequence counter with the values of the third node message sequence counter.

18. A method of synchronizing a node message sequence counter of a rebooting node of a plurality of nodes, the method comprising:
    a first node outputting a multicast message to a plurality of nodes; and
    a second node of the plurality of nodes sending its node message sequence counter to the first node; and
    wherein there is in response to receiving the multicast message, a response message sent by the second node which synchronizes the node message sequence counter of the first node with the node message sequence counter of the second node;
    wherein the first node ignores any further response messages after receiving the response message from the second node;
    wherein the first node resumes normal communication with other nodes using the synchronized node message sequence counter.

19. The method of claim 18, wherein the first node is the rebooting node and sends out the multicast message in response to rebooting.

* * * * *